United States Patent [19]

Forler et al.

[11] Patent Number: 5,327,176
[45] Date of Patent: Jul. 5, 1994

[54] AUTOMATIC DISPLAY OF CLOSED CAPTION INFORMATION DURING AUDIO MUTING

[75] Inventors: Joseph W. Forler; John F. Teskey, both of Indianapolis; Michael D. Landis, Fishers, all of Ind.

[73] Assignee: Thomson Consumer Electronics, Inc., Indianapolis, Ind.

[21] Appl. No.: 18,361

[22] Filed: Mar. 1, 1993

[51] Int. Cl.$^5$ .............. H04N 5/44; H04N 5/445; H04N 5/60
[52] U.S. Cl. .............. 348/564; 348/565; 348/738; 348/632
[58] Field of Search .............. 358/147, 165, 188, 146, 358/142, 198, 181, 86, 194.1, 191.1; H04N 5/44, 5/445, 5/60

[56] References Cited

U.S. PATENT DOCUMENTS

| | | | |
|---|---|---|---|
| 4,229,765 | 10/1980 | Sanger | 358/188 |
| 4,449,145 | 5/1984 | Ciciora | 358/147 |
| 4,488,179 | 12/1984 | Krüger et al. | 358/181 |
| 4,554,584 | 11/1985 | Elam et al. | 358/165 |
| 4,862,268 | 8/1989 | Campbell et al. | 358/147 X |
| 5,128,987 | 7/1992 | McDonough et al. | 358/194.1 X |

FOREIGN PATENT DOCUMENTS 58-161581 9/1983 Japan .................. 358/198

OTHER PUBLICATIONS

Takiff, Jonathan, "New VCRs Compatible with VHS, VHS-C Formats", Times Union (AL), Knight-Ridder Edition; One Star, May 16, 1991.
"Multiport for ATV?", Consumer Electronics, Dec. 18, 1989.
Takiff, Jonathan, "High Tech Closed-Captioned TV Not Just for Hearing-Impaired Anymore", Daily News of Los Angeles (LA), Edition; Valley Section: LA.-LIFE, p. L23, May 13, 1993.

Primary Examiner—James J. Groody
Assistant Examiner—Safet Metjahic
Attorney, Agent, or Firm—Joseph S. Tripoli; Peter M. Emanuel; Robert D. Shedd

[57] ABSTRACT

A system for processing audio and video components of a television signal provides for automatic control of closed caption signal display in response to the status of an audio muting feature. The system includes an operating mode in which enabling audio muting also enables the closed caption display and disabling muting disables generation of the closed caption display.

9 Claims, 3 Drawing Sheets

AUTOMATIC DISPLAY OF CLOSED CAPTION INFORMATION DURING AUDIO MUTING

FIELD OF THE INVENTION

The present invention relates to television systems which include provisions for processing auxiliary video information such as closed caption data.

BACKGROUND

The video signal processing section of a television system may include provisions for decoding and displaying auxiliary video information such as closed caption data. Closed caption data includes ASCII digital data representing text corresponding the spoken audio information contained in a television signal. The closed caption data is displayed on the screen of the television system and is intended to provide a visible representation of the spoken portion of a television program as an aid to hearing impaired television viewers. In the United States, the closed captioning standard is set forth in Federal Communications Commission (FCC) regulations (see e.g., 47 CFR §§ 15.119 and 73.682). FCC regulations specify that digital closed caption data is to be transmitted in line 21 of field 1 in the video signal. Data representative of two ASCII characters is transmitted in each occurrence of line 21 of field 1. Future modifications to the standard may provide for closed caption data to select be located in other lines, e.g., line 21 of every field.

Closed caption data is obtained from the video signal by a decoder. The decoded signal is coupled to the video display when the closed captioning function is enabled by a hearing impaired viewer. A hearing impaired viewer may enable the closed captioning function by activating a switch (e.g., located on a remote control unit or on a control panel on the housing of the television system itself) or by selecting the closed captioning function from a menu displayed on the video screen during a control mode of operation. Once activated, closed captioning remains enabled until disabled by the viewer. A viewer that is not hearing impaired would tend to disable closed captioning function to avoid having the closed caption display interfere with the displayed video program.

A television system may also include an audio muting arrangement in the audio signal processing section. Activating the audio muting function causes the audio output from the television system to be disabled. The volume control setting is not affected so that when audio muting function is disabled, the normal audio output is reestablished without adjustment of the volume. Audio muting may be activated, for example, via a remote control unit.

Audio muting is useful in a variety of circumstances. For example, a user may wish to disable the audio output (i.e., enable muting) when answering the telephone or during a conversation. Although audio muting is useful under these circumstances, a viewer may undesirably miss important spoken information of the television program being viewed while the audio is muted.

SUMMARY OF THE INVENTION

The present invention is directed to a system for processing a television signal in which a video signal processing channel includes provisions for decoding an auxiliary information signal component, such as closed captioning data, contained in the video component of the television signal and for including the auxiliary information signal in a video output signal, and in which an audio signal processing channel includes provisions for selectively disabling or otherwise inhibiting the generation of an audio output signal. Specifically, in accordance with the invention, the auxiliary information signal is automatically caused to be included in the video output signal when the generation of the audio output signal is inhibited or disabled. The auxiliary information signal is excluded from the video output signal when the normal generation of the audio output signal is no longer inhibited.

DETAILED DESCRIPTION OF THE DRAWING

Figure 1:
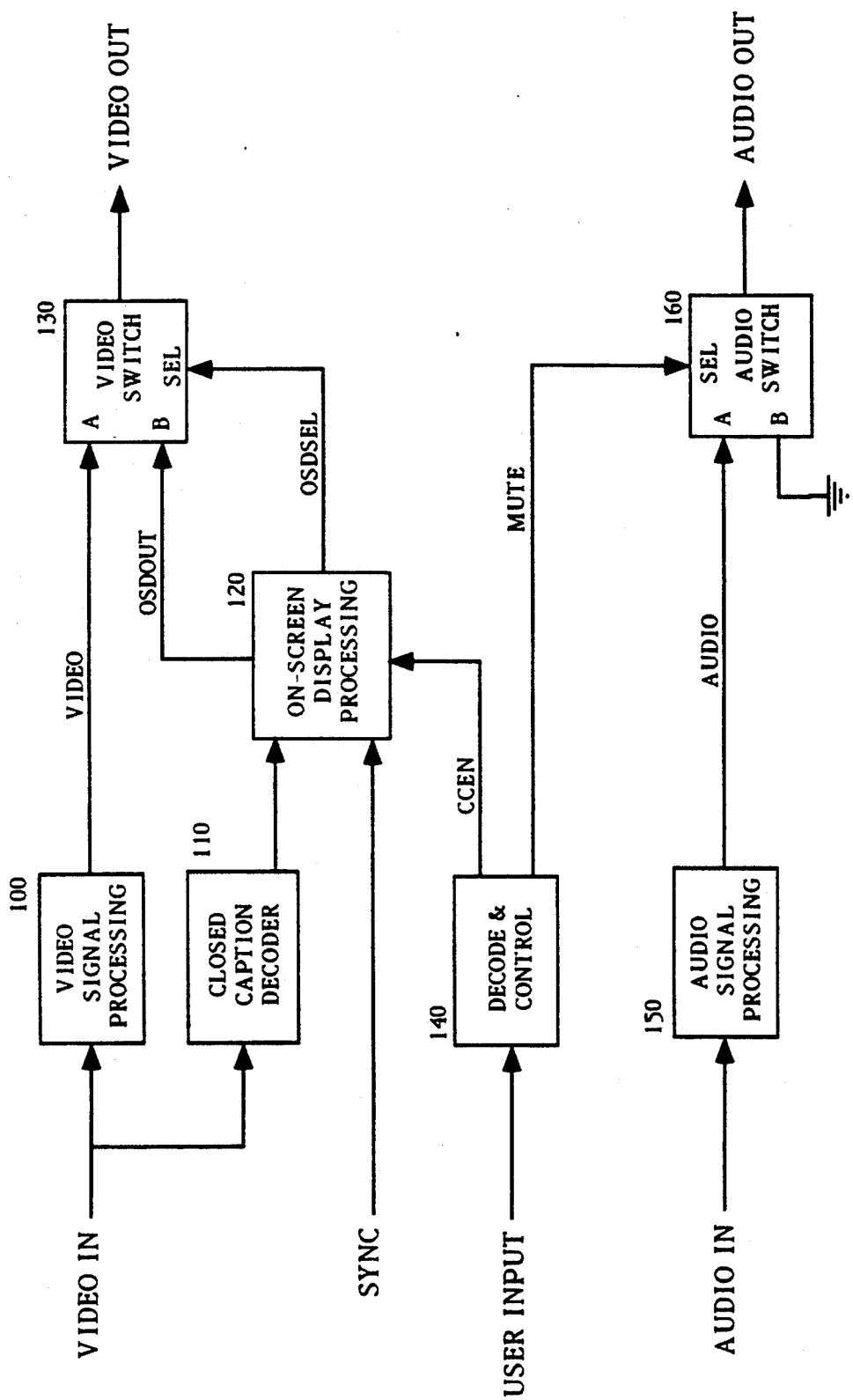
FIG. 1 shows, in block diagram form, a portion of a television signal processing system including an embodiment of the present invention.

As shown in FIG. 1, a television signal processing system includes a video signal processing channel 100 and an audio signal processing channel 150 for processing respective ones of a video component VIDEO IN and an audio component AUDIO IN of an input television signal. Video component VIDEO IN includes an auxiliary information component in the form of closed caption (CC) data which is derived from the video component by a closed caption decoder 110. On-screen display (OSD) processor 120 responds to signals including the decoded closed caption data to generate an on-screen display signal OSDOUT. OSD processor 120 is enabled to produce a display of closed caption data in response to an appropriate level (e.g., a logic 1) of a signal CCEN. Other functions of OSD processor 120 may include the generation of a channel number display and the generation of a function menu display. A function menu permits a viewer to various functions of the television system such as the closed captioning function.

To ensure that OSD information is displayed in the correct portion of the video display, the operation of OSD processor 120 is synchronized with the operation of video processor 100 in response to vertical and horizontal synchronization signals represented by signal SYNC in FIG. 1. When on-screen display information is to be displayed, a video switch 130 is caused to decouple a signal VIDEO produced by video signal processing channel 100 from a video output, at which a video output signal VIDEO OUTPUT is produced, and to coupled signal OSDOUT produced by OSD processor to the video output instead. Switch 130 responds to a signal OSDSEL produced by OSD processor 120 to select the source of video output signal VIDEO OUT. Switch 130 is caused to couple signal VIDEO to the video output to produce signal VIDEO OUT when signal OSDSEL is at the logic 0 level, and to couple signal OSDOUT to the video output to produce signal VIDEO OUT when signal OSDSEL is at the logic 1 level.

Audio signal processing channel 150 processes audio component AUDIO IN to produce a signal AUDIO. An audio mute function is provided by an audio switch 160 which operates in response to a signal MUTE. During the normal audio reproduction mode of operation, signal MUTE is at the logic 0 level causing switch 160 to couple signal AUDIO to an audio output in order to produce an audio output signal AUDIO OUT. When the audio muting function is enabled, signal MUTE is caused to be at the logic 1 level and switch 160 is, as a result, caused to decouple signal AUDIO from the audio output and to couple signal ground to the audio output instead. This prevents an audio response from being produced.

Signals CCEN and MUTE are generated by a decode and control unit 140 in response to user input information, indicated by signal USER INPUT in FIG. 1. For example, a television viewer may activate a MUTE switch (not shown) on a remote control (not shown) to enable the audio muting function. Decode unit 140 detects activation of the MUTE switch and provides an appropriate muting control signal MUTE. Activation of the MUTE switch causes the existing state of the muting control signal MUTE to be toggled. For example, if signal MUTE is at the logic 0 level, indicating that the muting function is disabled, activating the MUTE switch will cause the level of signal MUTE to change to the logic 1 level, thereby enabling the muting function. Conversely, when the muting function is enabled, activating the MUTE switch will disable the muting function.

Signal CCEN is generated in response to user input commands related to various closed captioning modes of operation. Conventional closed captioning modes of operation may include enabling the closed captioning function at all times for a hearing impaired viewer or disabling the closed captioning functioning at all times for a viewer who is not hearing impaired. These modes of operation may be selected via an appropriate user input device, e.g., by means of a remote control unit, a control panel on the housing of the television system itself, or a displayed function selection menu item. Enabling the closed captioning function at all times provides for the display of closed caption text whether the audio muting function is enabled or disabled. This mode of operation is referred to as the "closed caption with audio" mode. To enable and disable the "closed caption with audio" mode of operation, decode and control unit 140 toggles the present state of signal CCEN in a manner similar to that described with respect to control signal MUTE.

Decode and control unit 140 also controls both of signals CCEN and MUTE together in order to provide a new mode of operation referred to as the "closed caption with mute" mode in which the closed captioning function is automatically enabled and disabled in response to enabling and disabling, respectively, the muting function. As with the "closed caption with audio" mode, the "closed caption with mute" mode of operation may be selected by activating an appropriate user input device. During the "closed caption with mute" mode, when signal MUTE is set to the appropriate logic level for enabling the audio muting function, signal CCEN is automatically set to the appropriate logic level to cause OSD processor 120 to produce a closed caption display. Conversely, when signal MUTE is set to the appropriate logic level for disabling the audio muting function, signal CCEN is automatically set to the appropriate logic level to cause OSD processor 120 to end the closed caption display. The "closed caption with mute" mode allows a viewer to visibly monitor the spoken portion of a television program and thereby not miss spoken information even though the audio response is muted.

Figure 2:
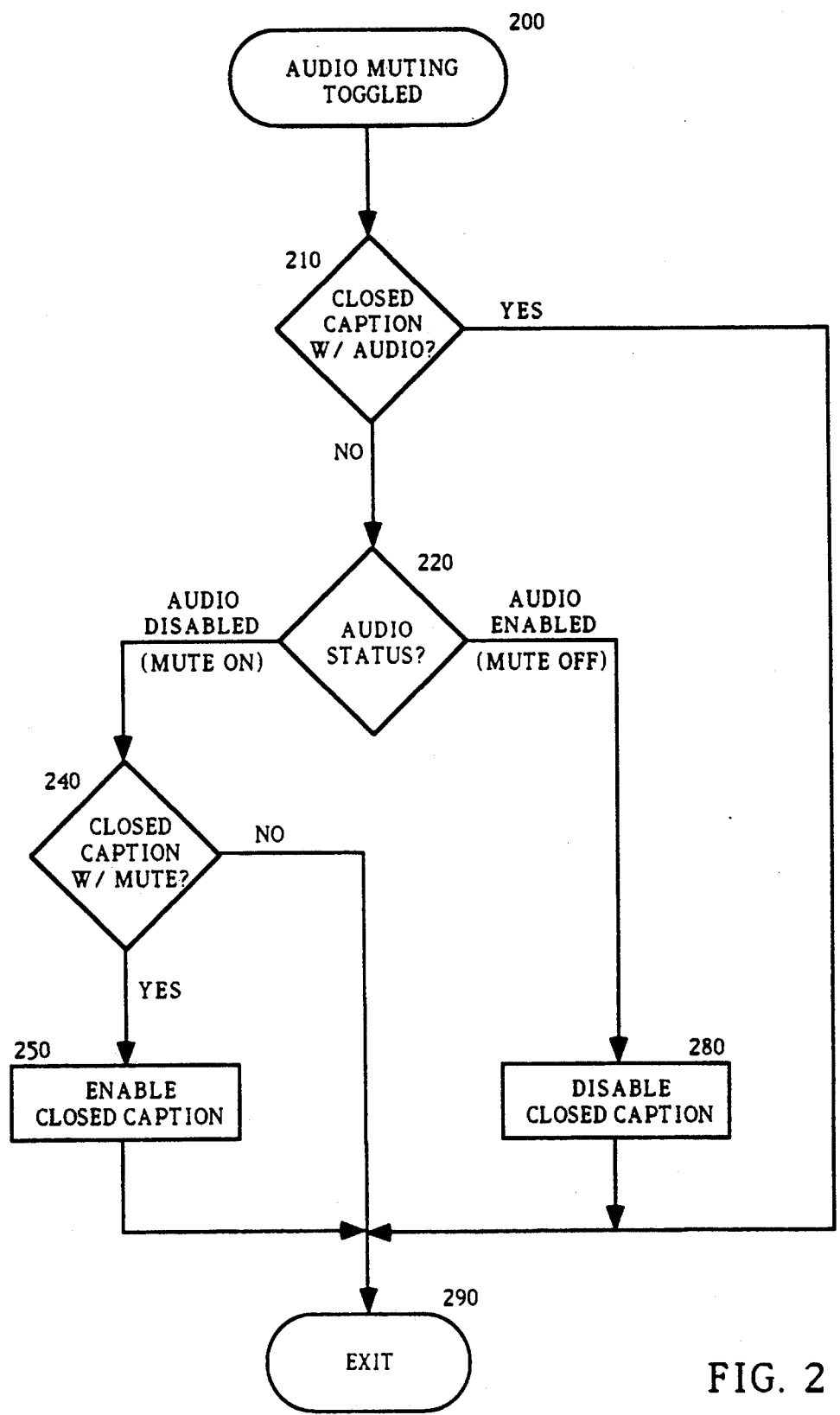
FIG. 2 illustrates a flowchart of a subroutine of a control program which may be used to implement a portion of the embodiment shown in FIG. 1.

The described functions of decode and control unit 140 may be performed by a microprocessor under appropriate software control. FIG. 2 shows a flowchart illustrating an approach to the microprocessor generation of signals CCEN and MUTE. When a muting switch is activated (or the status of a menu item relating to muting is changed), the logic level of signal MUTE is toggled, as described above. In response to the change in state of signal MUTE, the microprocessor enters the routine shown in FIG. 2 at step 200. At step 210, the microprocessor determines whether or not the user has selected the "closed caption with audio" mode of operation by testing a flag which is set when a user selects that mode of operation. If the "closed caption with audio" mode is selected, a closed caption display is generated at all times independent of the status of the muting function. As a result, no testing of the muting status is required and the microprocessor exits the routine in at step 290.

If the "closed caption with audio" mode is not selected, the operation continues at step 220, where the status of the muting function is tested by testing the state of a MUTE flag. If muting is enabled, the operation proceeds from step 220 to step 240, where the microprocessor determines whether or not the "closed caption with mute" mode is selected by testing an appropriate flag. If the "closed caption with mute" mode is selected, closed captioning is enabled at step 250 by the microprocessor establishing the appropriate state of signal CCEN (e.g., the logic 1 level) to enable closed captioning. The microprocessor then exits the routine at step 290. If the "closed caption with mute" mode is not selected, step 250 is bypassed and the microprocessor proceeds directly to step 290, where the routine is terminated.

When the audio status test at step 220 indicates that muting is disabled, operation continues at step 280 rather than at step 240. A necessary condition for reaching the audio status test at step 220 is that the "closed caption with audio" mode is not selected (test at step 210). Therefore, if step 220 indicates that muting is disabled, closed captioning is disabled. This is accomplished at step 280, where closed captioning is disabled by establishing the appropriate state of signal CCEN (e.g., the logic 0 level). Following step 280, the routine is terminated at step 290.

Figure 3:
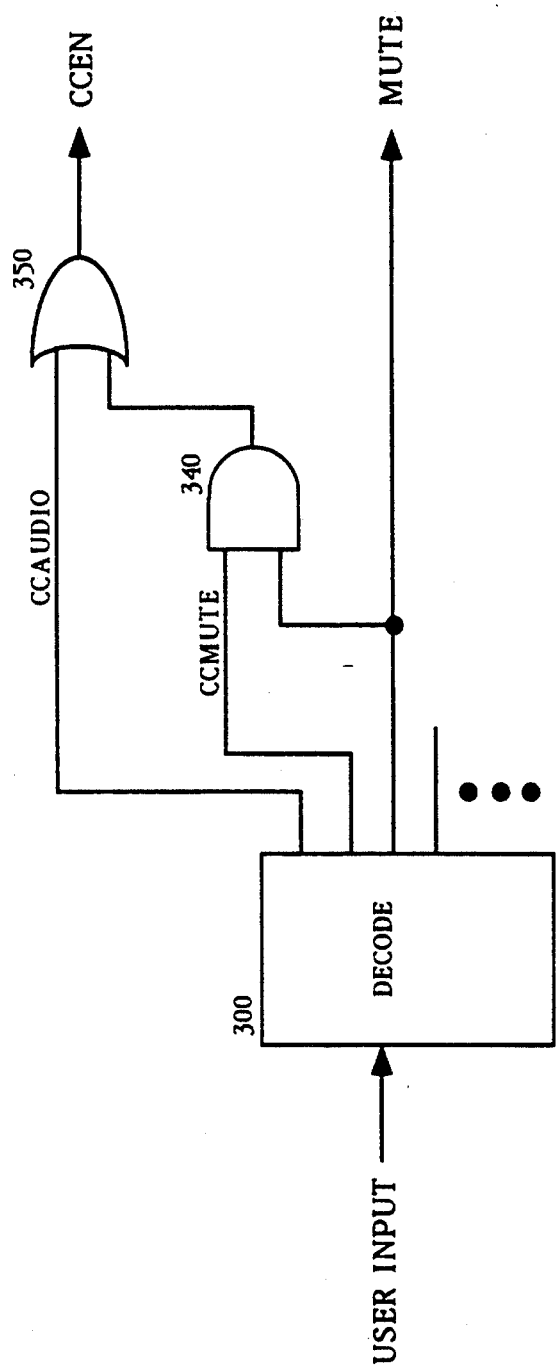
FIG. 3 shows, partially in block diagram form and partially in logic diagram form, an implementation of a portion of the embodiment shown in FIG. 1.

FIG. 3 shows a digital logic approach to implementing certain functions depicted in the flowchart in FIG. 2. In FIG. 3, decode unit 300 may be hard-wired decode logic or a microprocessor that interprets user commands USER INPUT. Decode unit 300 generates various control signals including signals CCAUDIO, CCMUTE, and MUTE. Signals CCAUDIO and CCMUTE indicate that the "closed caption with audio" and "closed caption with mute" modes of operation, respectively, are selected. Signal MUTE is representative of the muting status as described above. All three signals are held constant by decode unit 300 until the states of the closed captioning or muting functions are changed in response to a user's command.

In the arrangement shown in FIG. 3, signal CCAUDIO being at the logic 1 level indicates that the "closed caption with audio" mode is selected. OR gate 350 responds to signal CCAUDIO being at the logic 1 level by causing signal CCEN to be at the logic 1 level, thereby enabling closed captioning independent of the level of signal MUTE. If the "closed caption with audio" mode is not selected (i.e., signal CCAUDIO is at the logic 0 level), closed captioning is enabled via AND gate 340 when the "closed caption with mute" mode is selected (i.e., signal CCMUTE is at the logic 1 level) and muting is selected (i.e., signal MUTE is at the logic 1 level). Signal CCEN is at the logic 0 level (i.e., closed captioning is disabled) if signals CCAUDIO and CCMUTE are both at the logic 0 level. The arrangement in FIG. 3 may be modified to accommodate enabling closed captioning in additional operating modes by adding inputs to OR gate 350 to receive respective additional control signals.

Either implementation of decode and control unit 140, i.e. the microprocessor based control approach shown in FIG. 2 or the digital logic approach in FIG. 3, may be included within OSD processor 120. Also, various portions of the arrangement shown in FIG. 1, such as closed caption decoder 110, decode and control unit 140, and OSD processor 120, may included in a single integrated circuit.

Although the present invention is described in the context of user control of an audio muting function, the invention may also be useful in situations where muting is activated automatically during a particular operating mode of a television system. The embodiment may also be modified so that the closed captioning function is automatically enabled when the audio response is inhibited in some manner other than by completely disabling it. For example, the closed captioning function may be automatically enabled when the audio response is reduced in volume to a preset level. In addition, the invention may be useful in television systems that provide for processing types of auxiliary video information other than closed captioning data, such as teletext data.

We claim:

1. In a system for processing a television signal including a video component and a related audio component corresponding to respective visible and audible portions of the same television program, said audio portion containing a spoken portion related to said visible portion of said television program, said video component containing an auxiliary information component corresponding to a visible representation of said spoken portion of said television program, apparatus comprising:

means responsive to said video component for generating a video output signal corresponding to said visible portion of said television program;

means responsive to said auxiliary information component for selectively generating an auxiliary information output signal corresponding to said visible representation of said spoken portion of said television program related to said visible portion of said television program;

means for including said auxiliary information output signal, when generated, in said video output signal for displaying said visible representation of said spoken portion of said television program together with said related visible portion of said television program;

means responsive to said audio component for generating an audio output signal corresponding to said audible portion of said television program;

means for inhibiting the normal generation of said audio output signal during a predetermined operating condition of said system; wherein said auxiliary information output signal generating means is coupled to said audio output signal inhibiting means for generating said auxiliary information output signal during said predetermined operating condition of said system when enabled to do so; and means are coupled to said auxiliary information output signal generating means for, in a first mode, enabling said auxiliary information output signal generating means to generate said auxiliary information signal during said predetermined operating condition of said system, and for, in a second mode, disabling said auxiliary information output signal generating means from generating said auxiliary information output signal during said predetermined operating condition of said system.

2. The apparatus of claim 1 further comprising:

means responsive to activation by a user for generating a control signal; and wherein said audio output inhibiting means is an audio muting circuit responsive to said control signal for disabling the generation of said audio output signal to establish said predetermined operating condition; and said auxiliary information output signal generating means, in said first mode, is responsive to said control signal for generating said auxiliary information output signal when audio muting is enabled and, in said second mode, is not responsive to said control signal for generating said auxiliary information output signal when said audio muting is enabled.

3. The apparatus in claim 2 wherein said auxiliary information output signal is a closed caption signal.

4. In a system for processing a television signal including a video component and a related audio component corresponding to respective visible and audible portions of the same television program, said audio portion containing a spoken portion related to said visible portion of said television program, said video component containing an auxiliary information component corresponding to a visible representation of said spoken portion of said television program, apparatus comprising:

means responsive to said video component for generating a video output signal corresponding to said visible portion of said television program;

means responsive to said auxiliary information component for selectively generating an auxiliary information output signal corresponding to said visible representation of said spoken portion of said television program related to said visible portion of said television program;

means for including said auxiliary information output signal, when generated, in said video output signal for displaying said visible representation of said spoken portion of said television program together with said related visible portion of said television program;

means responsive to user input for generating a control signal indicative of an operating condition of said system; and means responsive to said control signal and to said audio component for generating an audio output signal in response to a first state of said control signal, and for inhibiting the normal generation of said audio output signal in response to a second state of said control signal; wherein said auxiliary information output signal generating means is responsive to said second state of said control signal for generating said auxiliary information output signal when enabled to do so; and means are coupled to said auxiliary information output signal generating means for, in a first mode, enabling said auxiliary information output signal generating means to generate said auxiliary information output signal in response to said second state of said control signal, and for, in a second mode, disabling said auxiliary information signal generating means for generating said auxiliary information output signal in response to said second state of said control signal.

5. In a system for processing a television signal including a video component and a related audio component corresponding to respective visible and audible portions of the same television program, said audio portion containing a spoken portion related to said visible portion of said television program, said video component containing an auxiliary information component corresponding to said spoken portion of said television program, apparatus comprising:

a video signal processing channel responsive to said video component for generating a video output signal corresponding to said visible portion of said television program;

means responsive to said auxiliary information component for generating an auxiliary information output signal corresponding to said visible representation of said spoken portion of said television program related to said visible portion of said television program;

an audio signal processing channel responsive to said audio component and to a control signal for selectively generating an audio output signal;

means for generating said control signal such that said control signal exhibits a first state representative of a first operating condition of said system during which said audio output signal is generated, and a second state representative of a second operating condition of said system during which said audio output signal is inhibited; and switching means for selectively including said auxiliary information output signal in said video output signal; wherein said switching means is responsive to said second state of said control signal for including said auxiliary information output signal in said video output signal for displaying said visible representation of said spoken portion of said television program together with said related visible portion of said television program during said second operating condition of said system when enabled to do so; and means are coupled to said switching means for, in a first mode, enabling said switching means to include said auxiliary information output signal in said video output signal when said system in is said second operating condition, and for, in a second mode, disabling said switching means from including said auxiliary information output signal in said video output signal when said system is in said second operating condition.

6. The apparatus of claim 5 wherein said auxiliary information signal is a closed caption signal.

7. The apparatus recited in claim 1, wherein:

said means coupled to said auxiliary information output signal generating means is selectively enabled to generate or disabled from generating said auxiliary information output signal during said predetermined operating condition in response to activation of an input device by a user.

8. The apparatus recited in claim 4, wherein:

said means coupled to said auxiliary information output signal generating means is selectively enabled to generate or disabled from generating said auxiliary information output signal in response to said second state of said control signal in response to activation of an input device by a user.

9. The apparatus recited in claim 5, wherein:

said means coupled to said auxiliary information output signal generating means is selectively enabled to include or disabled from including said auxiliary information output signal in said video output signal when said system is in said second operating condition in response to activation of an input device by a user.

* * * * *